Jan. 16, 1940.  M. F. MILLER  2,187,276
HOLDER FOR LIQUID INSECTICIDES
Filed July 31, 1939
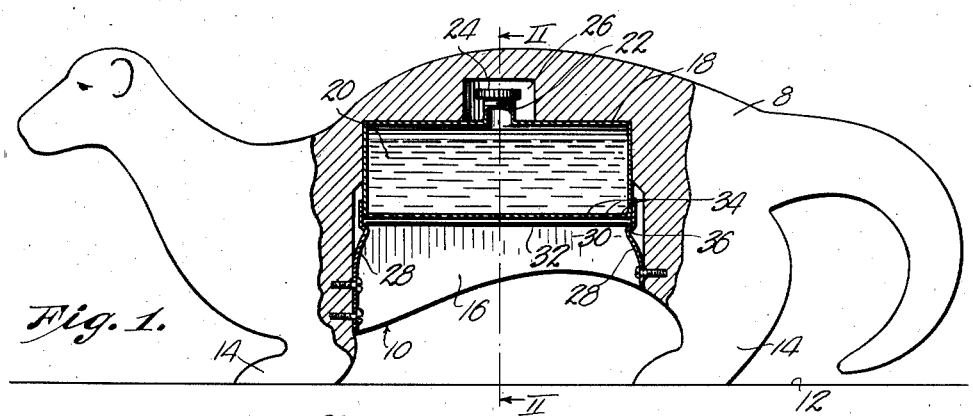
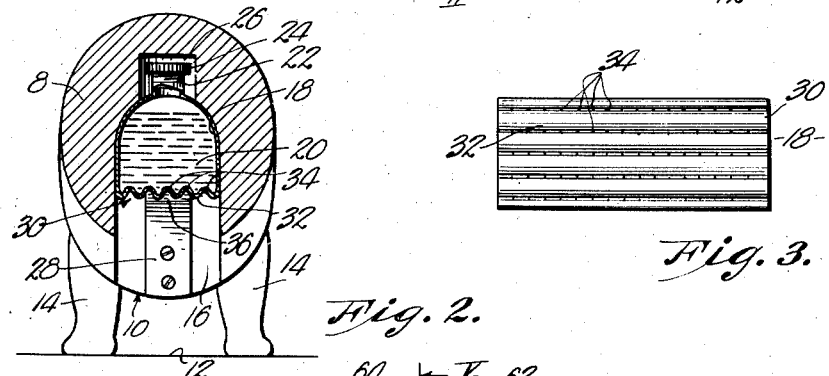
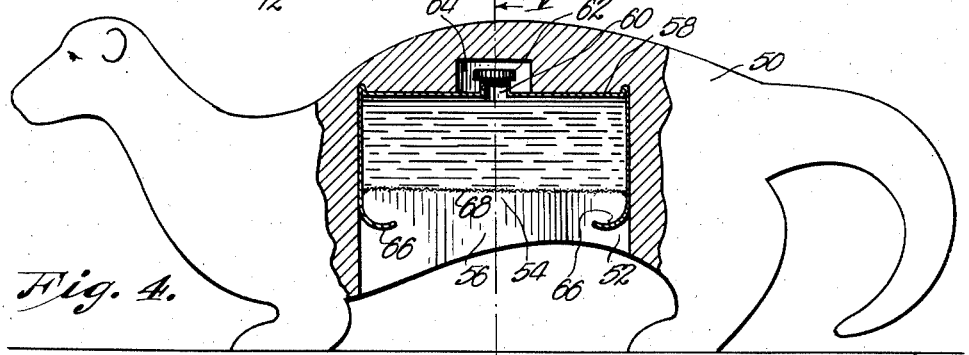
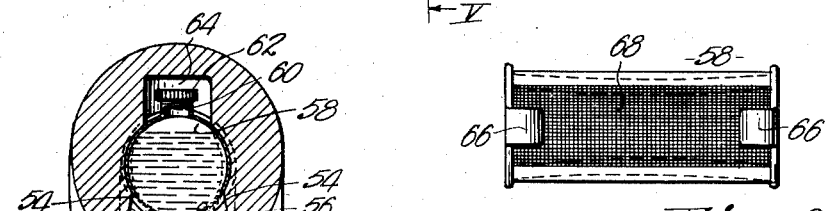
INVENTOR.
Milo F. Miller
BY Hovey & Hamilton
ATTORNEYS Patented Jan. 16, 1940

2,187,276

UNITED STATES PATENT OFFICE 2,187,276

HOLDER FOR LIQUID INSECTICIDES

Milo F. Miller, Kansas City, Mo.

Application July 31, 1939, Serial No. 287,477

7 Claims. (Cl. 43—131)

This invention relates to holders for liquid insecticides and has for its primary object the provision of means for rendering accessible to insects a poisonous liquid for the purpose of extermination, while said liquid is retained in a position where it cannot be reached by animals and humans.

One of the important objects of the invention is the provision of an insecticide holder which presents an attractive and ornamental body that may be used as a decorative piece, without the casual observer being aware that the holder is functioning as an insect destroyer.

This invention has for another aim the provision of a holder for liquid insecticide which includes a specially formed reservoir disposed within a cavited body so that the foraminous face of said reservoir is concealed from the ordinary view, yet made accessible to insects attracted thereto by the ingredients of the liquid.

Another object of the invention is to provide a holder for liquid insecticide wherein is included novel and unique means for releasably maintaining a reservoir in place so that a portion of the wall thereof is made accessible to insects, yet inaccessible to those who should be protected from the liquid.

Features of the invention which form additional objects thereof will be described during the course of the following specification, referring to the accompanying drawing wherein:

Figure 1 is a side elevational of a holder for liquid insecticide made in accordance with this invention and having parts thereof broken away for clearness.

Fig. 2 is a vertical cross sectional view taken on line II—II of Fig. 1.

Fig. 3 is an inverted plan view of the reservoir illustrated in Fig. 1, entirely removed from its operative position.

Fig. 4 is a side elevational view of a holder for insecticides made to embody a modified form of the invention.

Fig. 5 is a vertical cross sectional view through the holder, taken on line V—V of Fig. 4; and, Fig. 6 is an inverted plan view of the reservoir forming a part of the assembly illustrated in Figs. 4 and 5.

The character of liquid insecticide which is effective in destroying insects is usually such as to render it dangerous to humans, domestic pets, and other animals, and therefore, access to the liquid in any satisfactory holder should be rendered difficult to all except the insect being exterminated. Further, holders for insecticides have been objectionable in that they are unsightly, create a dirty condition, and merely by their presence reveal that the holder is for the purpose of carrying a poisonous substance.

The embodiment of the present invention comprises a body 8 that is formed to present a simulation of an animal or the like, the lower side 10 of which is disposed a distance above the supporting surface 12 by legs 14.

A cavity 16 formed inwardly from the normally lower side 10 of body 8, receives a reservoir 18 wherein is contained the poisonous liquid insecticide 20.

In the form of the invention shown in Figs. 1 to 3 inclusive, reservoir 18 is made of suitable metal and provided with a filler neck 22 upon which is placed a cap 24. Cavity 16 has a portion 26 into which neck and cap 22 and 24 respectively project to insure a snug fit when reservoir 18 is in place.

Spring clips 28 secured to body 8 within cavity 16 releasably engage reservoir 18 so that it may be moved to and from the operative position with ease. When reservoir 18 is in place, as illustrated in Figs. 1 and 2, the lowermost wall thereof is spaced inwardly from lower side 10 so that only by entering cavity 16 can the insects gain access to liquid 20.

The lower portion or bottom wall 30 of reservoir 18, is created to present a sinuous outer surface 32 through the innermost areas thereof are formed openings 34. Thus, when the insects are attracted into cavity 16, they must further enter relatively small cavities formed by the sinuous surface 32 before they can withdraw liquid 20 through openings 34. These openings 34 are minute in form so that the liquid will not escape therethrough without assistance of an outside force. This outside force, of course, is the insect being destroyed, and since the higher areas of sinuous surface 32 are free from liquid, it is obvious that even if one should extend the finger into cavity 16 and wipe the outermost portions of surface 32 no liquid could be collected to cause a detrimental effect.

Clips 28 are formed in such a way as to have shoulders 36 thereon that snap into position when reservoir 18 is moved into cavity 16.

In the form of the invention shown in Figs. 4 to 6 inclusive, body 50 has a cavity 52 similar to the one hereinbefore mentioned, but the side walls are formed to present a pair of opposed shoulders 54, the inclined surfaces 56 of which progressively compress the sides of reservoir 58 as it is forced to the operative position.

Reservoir 58 has a filler neck 60 and a cap 62 therefor, which project into compartment 64 that is in communication with cavity 52. The ends of reservoir 58 are equipped with grips 66 by means of which the operator may withdraw the reservoir to fill the same when such becomes necessary. Reservoir 58 is provided with a panel 68 created of foraminous material, the openings of which are extremely minute so that liquid 70 in reservoir 58 will not escape therethrough without the aid of an outside force.

Foraminous material 68 is flexible and when reservoir 58 is forced past shoulders 54, the sides of the reservoir will arch inwardly, as shown in dotted lines of Fig. 6. After shoulders 54 have been past, the sheet metal resilient sides forming a part of reservoir 58, will resume their normal position and preclude accidental dropping of the reservoir from within cavity 52.

The liquid forming the insecticide has a consistency heavier than that of water and therefore, its surface tension at the openings in both forms of the invention, presents a surface tension which is great enough to preclude escape until an insect draws a portion of the liquid through either openings 34 or foraminous material 68, as the case may be.

From the foregoing, it will be apparent to one skilled in the art that the holder for insecticide, which is made to embody the concepts of this invention, presents a large number of advantages and fulfills the objects thereof, and even though but two forms of holders have been illustrated and described, it is desired to be limited only by the scope of the appended claims.

Having thus described the invention, what is claimed as new and desired to be secured by Letters Patent is:

1. A holder for liquid insecticide comprising a body having a cavity formed inwardly from a normally lower side thereof; a reservoir for the liquid provided with a plurality of minute openings through the lowermost portion thereof; and yieldable means for securing the reservoir in place within the cavity with the said lowermost portion spaced inwardly from the lower side of the body, said minute openings being small enough to prevent escape of the liquid insecticide without an outside force.

2. A holder for liquid insecticide comprising a body having a cavity formed inwardly from a normally lower side thereof; a reservoir for the liquid provided with a plurality of minute openings through the lowermost portion thereof; and yieldable means for securing the reservoir in place within the cavity with the said lowermost portion spaced inwardly from the lower side of the body, said lowermost portion of the reservoir having a sinuous surface, the openings therethrough being located at the innermost areas of the said sinuous surface.

3. A holder for liquid insecticide comprising a body having a cavity formed inwardly from a normally lower side thereof; a reservoir for the liquid provided with a plurality of minute openings through the lowermost portion thereof; and yieldable means for securing the reservoir in place within the cavity with the said lowermost portion spaced inwardly from the lower side of the body, the lowermost portion of said reservoir constituting a fine mesh screen capable of holding the liquid within the reservoir until drawn therethrough by insects.

4. A holder for liquid insecticide comprising a body having a cavity formed inwardly from a normally lower side thereof; a reservoir for liquid having horizontally disposed portion having a sinuous outer surface and provided with a plurality of openings through the innermost areas of the said surface; spring clips in the cavity for removably holding the reservoir in place; and a filler opening in the reservoir.

5. A holder for liquid insecticide comprising a body having a cavity formed inwardly from a normally lower side thereof; a reservoir for liquid in the cavity; retaining shoulders formed on the body within the cavity for holding the reservoir in the operative position; and a filler neck on the reservoir, said reservoir having a lowermost section formed of foraminous material capable of retaining liquid in the reservoir until drawn through the material by insects.

6. A holder for liquid insecticide comprising a body having a cavity formed inwardly from a normally lower side thereof; a reservoir for liquid in the cavity; retaining shoulders formed on the body within the cavity for holding the reservoir in the operative position; and a filler neck on the reservoir, said reservoir having a lowermost section formed of foraminous material capable of retaining liquid in the reservoir until drawn through the material by insects, the shoulders being in opposed relation and having upwardly and inwardly inclined faces to flex the reservoir as it is moved to and from the operative position.

7. A holder for liquid insecticide comprising a body having legs to hold the same above a supporting surface and provided with a cavity formed inwardly from the side from which the legs extend; and a reservoir in the cavity with the lowermost portion thereof spaced inwardly from the said side of the body, the lowermost portion of the reservoir having openings therethrough for feeding insecticide, said body having means in the cavity for releasably holding the reservoir in place.

MILO F. MILLER.